United States Patent [19]

Casler et al.

[11] 4,009,499
[45] Mar. 1, 1977

[54] APPARATUS FOR TREATING THE SURFACE OF AN ARTICLE

[76] Inventors: William H. Casler, 35321 Beach Road, Capistrano Beach, Calif. 92624; Lance Morris, 1426 E. 15th St., Santa Ana, Calif. 92701

[22] Filed: Mar. 25, 1976

[21] Appl. No.: 670,392

[52] U.S. Cl. .................... 15/21 D; 51/48 R
[51] Int. Cl.² ........................ A46B 13/02
[58] Field of Search .......... 15/21 R, 21 C, 21 D, 15/21 E, 97 R; 51/47, 48 R, 50 R, 51, 105 R, 106 R

[56] References Cited
UNITED STATES PATENTS

| | | |
|---|---|---|
| 2,142,710 | 1/1939 | Bigelow .................... 51/50 R |
| 2,707,851 | 5/1955 | Strong .................... 15/21 D |
| 3,849,819 | 11/1974 | Sullivan et al. ............ 15/21 D |

*Primary Examiner*—Edward L. Roberts
*Attorney, Agent, or Firm*—Donald D. Mon

[57] ABSTRACT

Apparatus for treating the surface of an article, for example a metallic automobile wheel, comprises a rotatable clamping table for holding the article, the clamping operation being performed by dogs manually operable by a bell crank for engaging the article. The surface of the article is treated or rubbed by a rotating wheel mounted on a support provided with universal movement by swivel and toggle means, so that the treating wheel may be moved to various positions and orientations against the surface of the article and also against an adjacent source of rubbing or buffing compound. The article clamping table and the treating wheel are rotated by electric motors.

9 Claims, 4 Drawing Figures

APPARATUS FOR TREATING THE SURFACE OF AN ARTICLE

This invention relates to apparatus for treating the surface of an article and is particularly applicable to the cleaning, polishing or finishing of a metallic wheel of a vehicle.

Articles such as metallic automobile wheels, particularly aluminum alloy wheels (sometimes called "mag wheels"), are subject to acquiring surface dullness which detracts from their bright or shiney appearance. It has heretofore been a practice, particularly in the case of mag wheels to polish the wheels from time to time. This has required removal of the wheel from the vehicle and also removal of the tire from the wheel in order that a polishing device may be applied to the various surfaces of the wheel which, as is well known, is a non-planar article having surfaces which are curved or oriented in various directions.

An object of the present invention is to provide apparatus capable of cleaning or polishing a vehicle wheel without the necessity of removing the tire from the wheel. It can also finish it by removing machinery marks and lines, and mold lines.

A related object is to provide such apparatus capable of rubbing, cleaning, polishing or grinding other articles of non-planar or curved surface configuration as well as vehicle wheels.

The invention is carried out by provision of a rotating mounting table provided with clamping means for clamping the wheel or other article to the table. A rotatable treating wheel is mounted to a support in proximity to the mounting table.

A feature of the treating wheel support resides in provision of means whereby the treating wheel may be moved into various positions and orientations in a universal or three-dimensional manner, so that it may be moved into contact or out of contact with the clamped article and may be oriented to contact with various different surface configurations of the article. Means is provided for rotating the article clamping table and also the treating wheel so that during the rotation of the clamping table containing the article or vehicle wheel being treated, all surfaces thereof which it is desired to rub or treat are contacted by the treating wheel.

A feature resides in bell crank means operable on dogs at the clamping table for clamping the article.

A preferred feature resides in provision of a source of rubbing compound in proximity to the treating wheel so that rubbing or buffing compounds such as rouge may be applied to the treating wheel.

The foregoing and other features of the invention will better understood from the following detailed description and the accompanying drawings of which:

Figure 1:
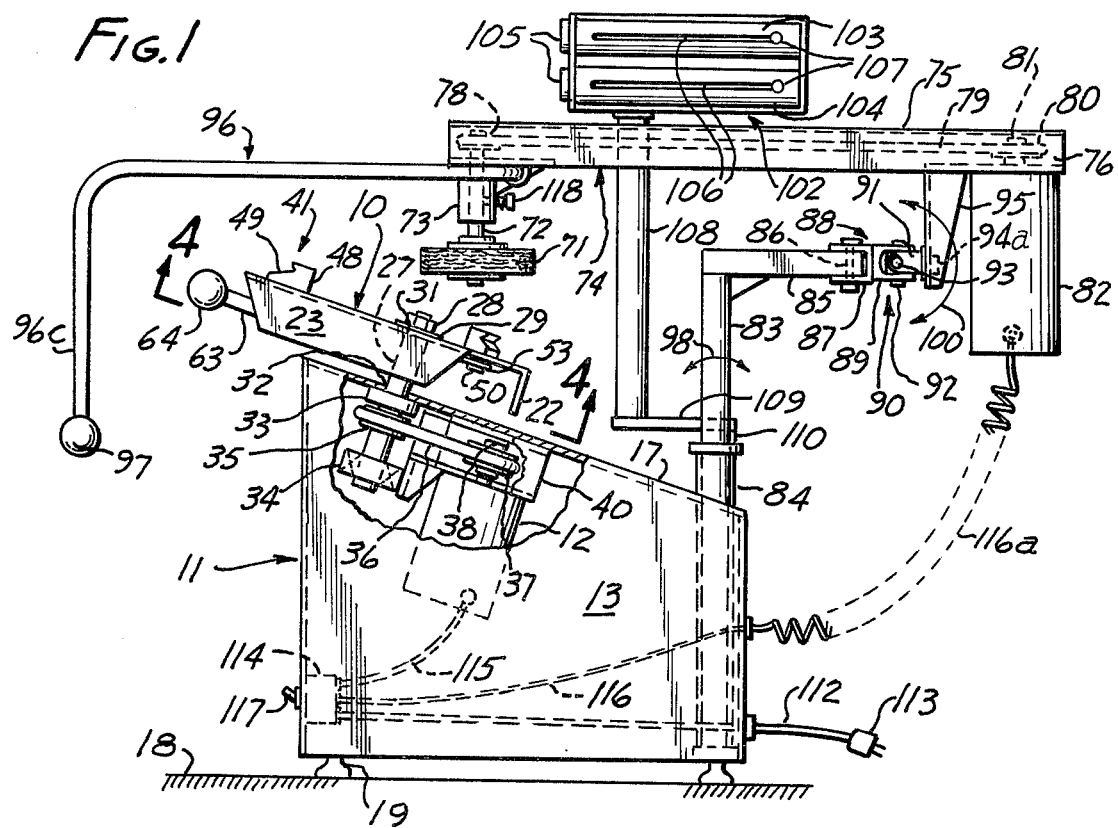
FIG. 1 is a side elevation view of a cleaning or polishing apparatus according to this invention, showing a housing partially broken away to reveal parts in the interior.

Referring to the drawings, at table 10 adapted for mounting thereon an automobile wheel to be cleaned or polished, is rotatably mounted to a housing 11 which contains a motor 12 for rotating the table. The housing has four vertical sides 13, 14, 15 and 16 and a top cover 17 which slants rearwardly toward the horizontal floor 18 on which the housing rests on feet 19 at its four corners.

The table 10 comprises a flat top 20, shaped generally as an equilateral triangle, having three depending sides 21, 22, and 23. The sides of the triangular plate are not brought completely together to form corners, but instead the corner portions are squared off at 24, 25 and 26, at which places there are no depending sides. A drive shaft is attached at the central position of the triangular plate 20 by suitable means such as a nut 28 threaded to a threaded portion of the shaft protruding upwardly through the top of the plate and tightening the plate between washer 29 and a shoulder 31 of the shaft. The shaft 27 extends downwardly through an opening 32 through the top cover 17 of the housing and through spaced bearing members 33 and 34 attached to the housing beneath the top plate 17. A pulley wheel 35 is attached to the shaft at a position between the two bearings 33 and 34 and is coupled by means of a pulley belt 36 to a pulley wheel 37 affixed to the shaft 38 of electric motor 12 fastened within the housing by a bracket 40.

Figure 3:
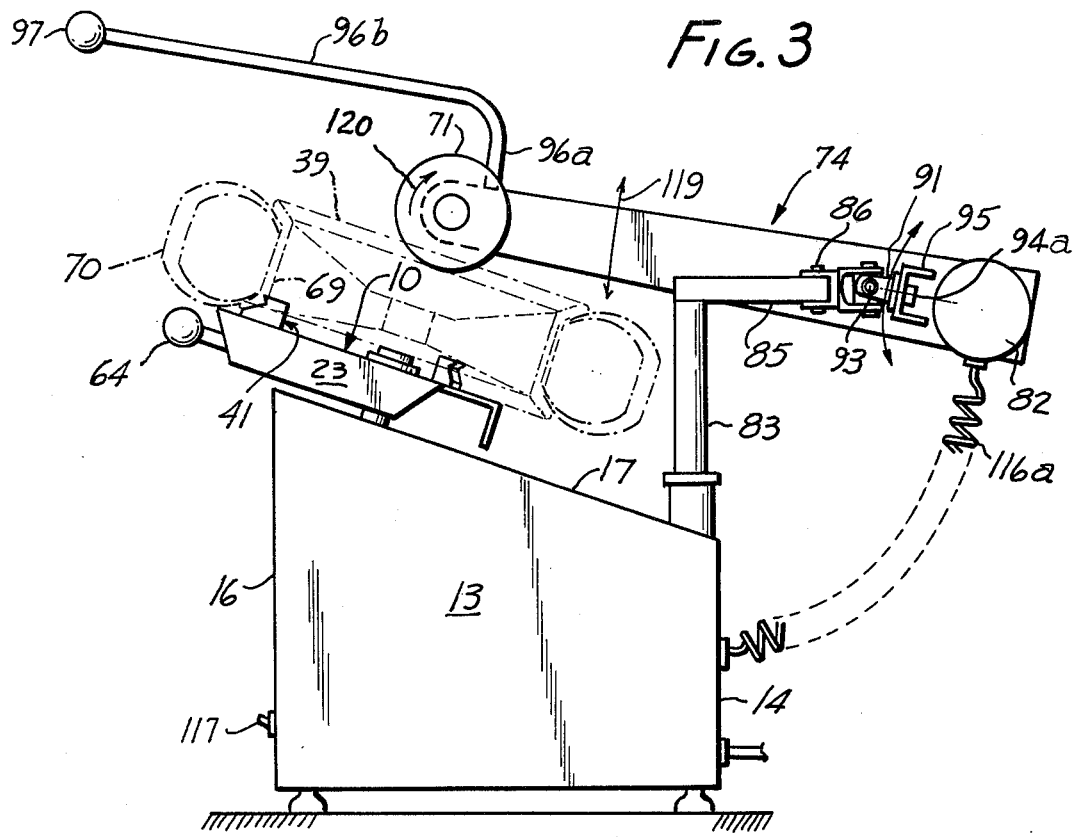
FIG. 3 is a side elevation of the apparatus showing a wheel in position for cleaning or polishing.

Means is provided for clamping a wheel 39, shown in phantom in FIG. 3, to the clamping table 10. This comprises clamping dogs 41, 42 and 43 slidable in respective slots 44, 45 and 46 formed through the wheel mounting table top 20.

Figure 4:
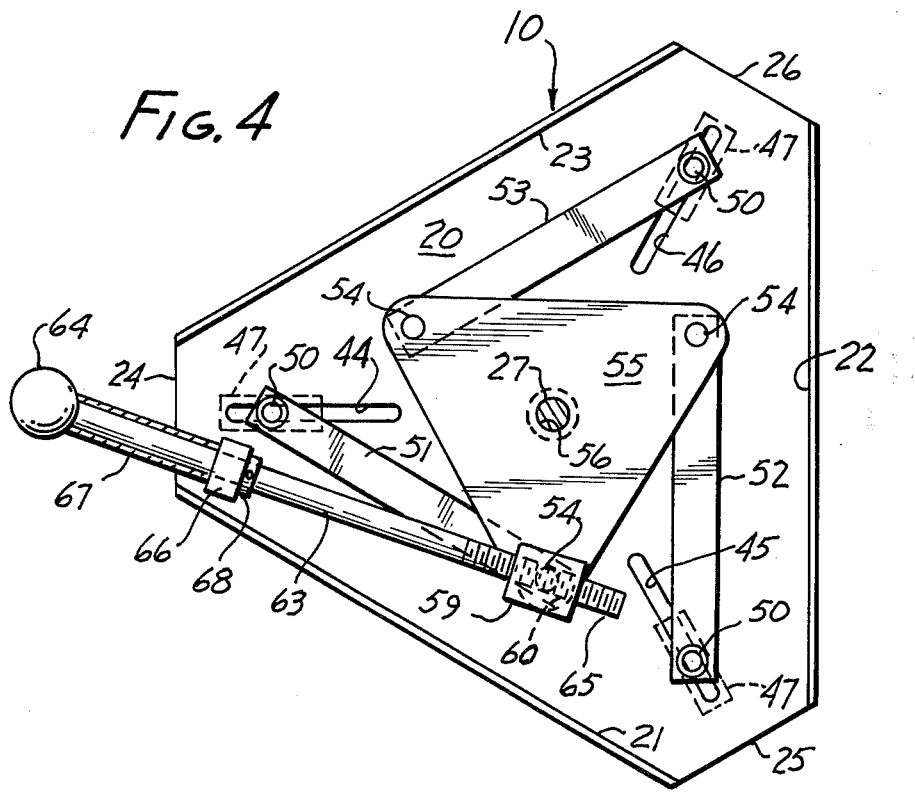
FIG. 4 is a cross-section view looking from line 4—4 of FIG. 1.

The longitudinal axes of the respective slots extend along a line from the axis of shaft 27 to the center positions of the respective parts 24, 25 and 26 of the table. Each of the clamping dogs comprises a member 47 having a flat rectangular under surface shown in FIG. 4, which slides on the upper surface of the table top 20, and a raised portion 48 which extends above the table top 20 and which has a re-entrant V-shaped notch 49 facing toward the respective table edges 24, 25 and 26. The clamping dogs are rendered slidable within the slots by means of respective pins 50 fixed at the under side of each clamping dog and passing through the respective slot and into the region beneath the table top. Opposite sides of these pins are flattened to form flat parallel side surfaces rendering the pins slidable longitudinally through the slot while not permitting the pin to rotate in the slot. Link arms 51, 52 and 53 are pivotally attached to the respective ones of the pins 50, beneath the table top, as best seen in FIGS. 1 and 4. The pins 50 are enlarged below the link arms to hold the link arms to the pins. The opposite ends of the respective link arms 51, 52 and 53 are pivotally attached to respective pivot pins 54 fixed to an equilateral triangular shaped plate 55 located beneath the mounting plate 10, as seen in FIG. 4. a hole 56 is formed through the bell crank plate 55 at its central position, of a proper dimension to fit over shaft 27 such that the bell crank can rotate on the shaft.

The nut 59 is pivotally attached to the pivot pin 54 which passes through link arm 51, as seen in FIG. 4, the lower end of this pivot pin being enlarged below the nut to prevent the nut from falling off. The nut 59 has a threaded bore 60 through which the threaded end 65 of a lead screw 63 is threaded. The end of the lead screw 63 opposite its threads 65 is passed through a hollow tubular member 67 having at its end a ball handle 64. The end of the tubular member 67 opposite the ball handle abuts against a bracket 66 having through it a bore which accommodates the lead screw 63 so that the screw can rotate within the bracket. At the side of the bracket opposite that of the tubular member 67 a flange 68 is fixed to the lead screw so that the lead screw cannot move longitudinally relative to the bracket but can rotate relative to it. The bracket 68 is mounted to the underside of triangular plate 20. The lead screw makes a loose fit in a hole in the bracket so it can have limited pivotal movement. It is seen that when the handle 64 is turned to rotate the bolt lead screw 63 the effect is to draw the nut member 59 toward or away from the handle 64, depending upon the direction of rotation. This will rotate the triangular bell crank 55 on the shaft 27 such that when the direction of rotation of bolt 63 moves the member 58 toward the bolt handle 64 the direction of rotation of bell crank 55 is clockwise relative to FIG. 4. This pushes all of the link arms 51, 52, and 53 to move all the pins 50 radially away from shaft 27 so that the V's 49 of the dogs 41 are moved radially outward. Thus by turning bolt handle 64, the dogs can be positioned radially inward far enough to lie inside of the rim 69 of a wheel on which a tire 70 is mounted in FIG. 3. Then by turning the bolt 63 to move the clamping dogs radially outward, the dogs will arrive at the position where the re-entrant V's 49 engage the rim as shown in FIG. 3. This will clamp the wheel with the tire to the mounting table.

For treating the wheel while it is mounted to the mounting table, there is provided a wheel 71 fixed to a shaft 72 rotatable in a bearing member 73 fastened to a supporting arm 74. The wheel 73 may be of a type applicable to the particular treatment to be performed. It may for example be a brush such as a sisal brush or the like or a wire brush for cleaning or removing rust. As an example, it is assumed that wheel 73 in the drawing is a buffing wheel. The supporting arm 74 is in the form of a channel beam having a top covering strip 75 and side strips 76 and 77 depending from the top strip. It may be either open or closed at the bottom. The buffing wheel shaft 72 extends upward from bearing member 73 (when oriented in the position shown in FIG. 1) into one end of the channel beam between its two sides 76 and 77 and beneath the top strip 75, as shown in FIG. 1 in dotted lines. At this position within the channel beam there is fixed to the shaft 72 a pulley wheel 78 which is coupled by an endless belt 79 to a pulley wheel 80 within the other end of the channel beam, fixed to the shaft 81 of an electric motor 82 fastened to the channel beam.

The channel beam (supporting arm 74) is supported by a vertical rotatable shaft 83 which is rotatable within a vertical pipelike member 84 fixed within the housing 11 and acting as a vertical bearing. An arm 85 fixed at one of its ends to the upper end of shaft 83, is attached at its other end to the pin 86 passing through opposite sides of the bracket 87 of a swivel 88. The base of bracket 87 is fastened by a pin 94 to one of the parts 89 of a toggle 90, the other part 91 of which is coupled to part 89 by two mutually perpendicular pins 92 and 93, one of which intersects and extends into the other.

Figure 2:
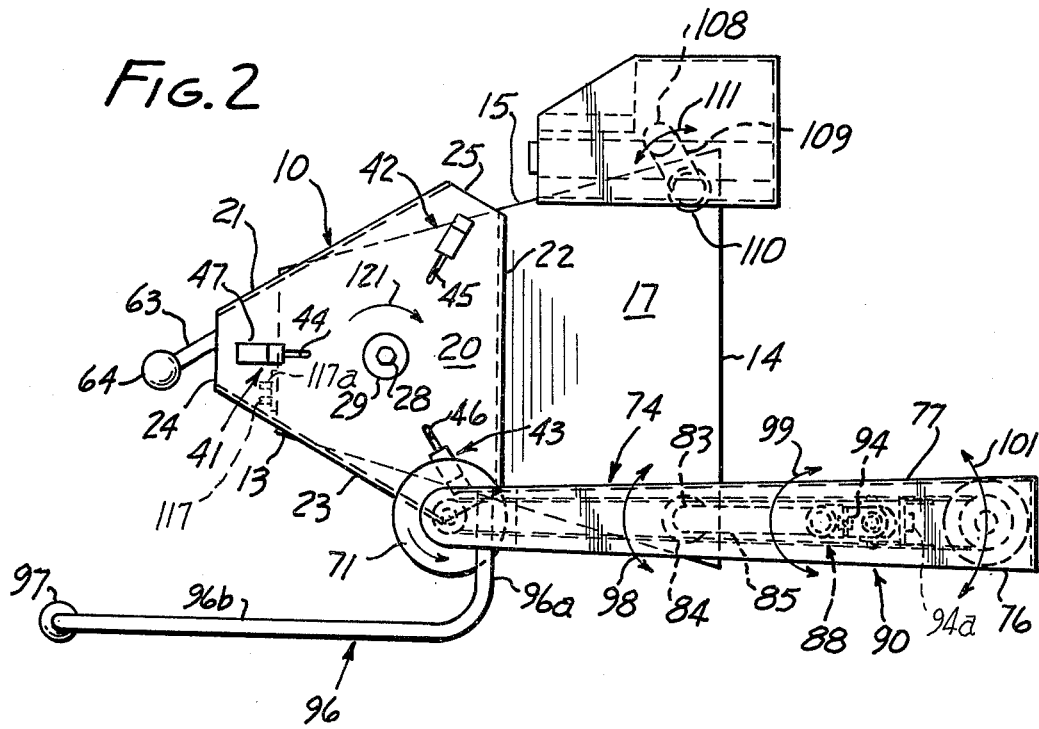
FIG. 2 is a top view of the apparatus shown in FIG. 1.

The toggle member 91 is rotatably attached to a support member 95 around a bearing 94a (FIG. 1) which is attached to, and extends from, the channel member 74. A handle bar 96 is attached to the channel member 74 at a forward position, and preferably this is made angular having a straight section 96a extending horizontally from member 74 (when the buffing wheel 71 is to be in the position shown in FIGS. 1 and 2), a forwardly extending section 96b and a downwardly extending section 96c to the end of which there is attached a ball handle 97.

It is seen from the foregoing description that by manipulation of handle 97 the buffing wheel may be moved and oriented into a variety of different attitudes and positions by reason of the fact that the supporting linkages and members for the channel member 74 provide for universal movement. Thus, the shaft 83 can be rotated back and forth as indicated by arrow 98; the swivel 88 can be rotated back and forth as indicated by arrow 99; the toggle member 91 can be rotated back and forth on its pin 93, as indicated by arrow 100; toggle member 89 can be rotated back and forth on its pin 94 as indicated by arrow 101; and the assembly can be rotated around bearing 94a. Thus three dimensional or universal movement is provided for the buffing wheel.

Provision is made for facilitating application of buffing material or compound to the buffing wheel. This comprises a box 102 containing two tubes 103 and 104 containing the buffing material, ordinarily a rouge in the form of sticks 105 of the material. Such tubes are well known. Each tube has a longitudinal slot 106 through its side and at the rear end of each stick there is a plate (not shown), each plate having a knob 107 protruding from it and through the slot so that by pushing one or both knobs 107 toward the left, with reference to FIG. 1, the ends of the sticks protruding from the tubes can be pushed outward as the material is used.

The box 102 is supported on a vertical rod 108, the lower end of which is supported on one end of an offset bar 109. The other end of the offset bar is fixed to the upper end of a shaft 110 which extends toward into the housing 11 where it is rotatably held in suitable bearing means (not shown). Thus, the box 102 can be manually rotated back and forth on shaft 110 as indicated by arrow 111.

For the purpose of operating electric motors 12 and 82 there is an electric cord 112 provided with a well-known type of plug 113 for plugging into the socket of a source of electrical voltage. The cord 112 containing the electrical conductors is brought to a switch box 114 attached within housing 11. Two electric cords 115 and 116 each containing electric conductors are brought from the switch box to the respective motors 12 and 82, the cord 116 containing a flexible cord section 116a to accommodate movements of motor 82 occasioned by operation of handle bar 96. A pair of two-way snap switches 17 and 117a protrude through the housing from switch box 114. One of th switches when turned on connects the voltage source to motor 12, and the other switch when turned on connects the voltage source to motor 82. Thus each motor may be operated independently of the other, so that each motor may be operated alone or both motors may be operated at the same time.

A preferred refinement resides in the provision of a locking device 118 for locking the buffing wheel shaft 72 to prevent rotation at times when it is desired to remove and replace the buffing wheel, under which circumstance it is desirable that the shaft shall not move in rotation during this operation. This locking device may take the form of a headed pin which extends through a hole through bearing 73 and into a recess or hole in the shaft 72, or it may take the form of a threaded set screw which binds against the shaft when it is desired to lock the shaft against rotation.

To a polish a wheel, the wheel will be mounted on the clamping table as illustrated in FIG. 3, which may be done without removing the tire from the wheel, and the wheel will be clamped by manual operation of handle 64. The switches 117 and 117a will be thrown to the "on" position which will apply power to the motors 12 and 82 to rotate the mounting table 10 with the wheel on it and also rotate the buffing wheel 71. The buffing compound or rouge may then be applied to the buffing surface of the buffing wheel by moving the buffing wheel by manual operation of handle 97 to cause the buffing wheel to rub on the exposed ends 105 of the rouge sticks. This may be readily accomplished by reason of the universal movements associated with the buffing wheel supporting means, described above. The rotational capability of shaft 110 can facilitate this operation. Further manual operation of handle 97 will turn the buffing wheel to a proper attitude for the buffing operation, which will ordinarily be different from the attitude shown in FIG. 1.

FIG. 3 illustrates an attitude which the buffing wheel may have during its buffing operation. In FIG. 3 the buffing wheel 71 is shown in buffing contact with a wheel 89 clamped to the mounting table. It is seen that the operator has the option to maintain the buffing wheel in contact with the wheel 89 in this attitude for as long as desired and he might from time to time move the buffing wheel out of buffing contact by pushing upward on handle 97, with reference to FIG. 3. As indicated by arrow 119 the buffing wheel may be moved toward and away from vehicle 39 as may be desired, since channel member 74 pivots on pin 93.

As the vehicl wheel 39 rotates the buffing wheel makes buffing contact completely around wheel 39. Since wheel 39 will not have a surface in only one plane, but will generally have surfaces in many different planes or non-planer surfaces which are rounded in various configurations, the buffing wheel is enabled to reach all such surfaces by proper turning and moving of handle 97 to alter the orientation and attitude of buffing wheel 71 as may be desired. However, it will generally be desirable to rotate the wheel 71 in the direction of arrow 120.

When it is desired from time to time to apply more buffing compound or rouge to the buffing wheel it is only necessary to operate handle and perhaps turn shaft 110, to engage the buffing wheel with the rouge sticks 105 and then return the buffing wheel into contact with wheel 39. As the buffing compound is used by the buffing wheel in this manner the sticks 105 can be maintained in a protruding position by movement of knobs 107.

Although the article being polished has been particularly described herein as being an automobile wheel it will be recognized that other articles may be clamped and treated and such treatment may include, without being limited to, any one or more of the operations of flashing, grinding, cleaning, polishing and buffing.

This invention is not to be limited by the embodiments shown in the drawings and described in the description, which are given by way of example and not of limitation, but only in accordance with the scope of the appended claims.

We claim:
1. Apparatus for treating a surface of an article of which at least a portion of said surface is non-planar, comprising:
   a. a clamping table;
   b. means for clamping the article to the table;
   c. means for rotating the table and clamped article;
   d. a treating wheel;
   e. means for rotating the treating wheel;
   f. support means supporting the treating wheel in proximity to the article; and
   g. means for permitting universal movement of said support means,
   whereby the rotating treating wheel may be manually moved into and out of contact with said rotatable article and may be oriented in various positions and attitudes relative to the article to make contact with different parts of the surface of the article.

2. Apparatus according to claim 1 in which the means permitting universal movement of the treating wheel support means comprises a member rotatable about a first axis, a member rotatable about a second axis perpendicular to the first axis, and a member rotatable about a third axis perpendicular to the first and second axes.

3. Apparatus according to claim 2 including handle means attached to the support means for manually producing the universal movement.

4. Apparatus according to claim 1 in which a source of buffing material is located in proximity to the treating wheel so that the treating wheel may be moved into contact with the buffing material from time to time.

5. Apparatus according to claim 1 in which the clamping means comprises clamping dogs at the clamping table slidable relative to the clamping table and bell crank means at the table coupled to the dogs for moving the dogs against the article being polished to clamp it to the table.

6. Apparatus according to claim 5 in which the number of clamping dogs is at least three, and they are at spaced positions at the table, and their directions of sliding relative to the table are radial with reference to the axis of rotation of the table.

7. Apparatus according to claim 6 in which the table is provided with radially-extending slots, and the dogs slide along the slots.

8. Apparatus according to claim 1 in which the means permitting universal movement comprises swivel means and toggle means.

9. Apparatus according to claim 1 including motor means for rotating the clamping table and the treating wheel.

* * * * *